United States Patent
Rau et al.

(10) Patent No.: US 6,998,436 B2
(45) Date of Patent: Feb. 14, 2006

(54) INK FOR INK JET PRINTING AND METHOD OF USING THE INK

(75) Inventors: Manuela Rau, Nürnberg (DE); Wolfgang Storck, Fürth (DE)

(73) Assignee: J.S. Staedtler GmbH & Co., Nürnberg (DE)

( * ) Notice: Subject to any disclaimer, the term of this patent is extended or adjusted under 35 U.S.C. 154(b) by 651 days.

(21) Appl. No.: 10/060,408

(22) Filed: Jan. 30, 2002

(65) Prior Publication Data

US 2002/0115746 A1   Aug. 22, 2002

(30) Foreign Application Priority Data

Jan. 30, 2001   (DE) ................................ 101 03 851

(51) Int. Cl.
*C09D 11/10* (2006.01)
(52) U.S. Cl. ...................... 524/513; 524/519; 524/522; 427/256; 106/31.27; 106/31.6; 106/31.9
(58) Field of Classification Search ................ 156/277; 427/496, 508, 521, 372.2, 256; 347/100; 106/31.86, 31.87, 31.9, 503, 31.27, 31.6; 524/513, 519, 522
See application file for complete search history.

(56) References Cited

U.S. PATENT DOCUMENTS

| | | | |
|---|---|---|---|
| 4,168,254 A | | 9/1979 | Fell |
| 4,887,097 A | * | 12/1989 | Akiya et al. ................. 347/105 |
| 5,321,094 A | * | 6/1994 | McGee ........................ 525/387 |
| 6,022,661 A | * | 2/2000 | Kurose et al. ........... 430/108.7 |
| 6,332,943 B1 | * | 12/2001 | Herrmann et al. .......... 156/277 |

FOREIGN PATENT DOCUMENTS

EP   0730014   9/1996

* cited by examiner

*Primary Examiner*—Kriellion A. Sanders

(74) *Attorney, Agent, or Firm*—Friedrich Kueffner

(57) ABSTRACT

An ink for ink jet printing systems, preferably for continuous jet systems, contains as primary components coloring agents, organic solvents, conductivity mediators, and at least two binding agents, wherein the first binding agent is a bonding agent, and the second binding agent is a fixing agent and an agent for adjusting the viscosity. The ink is used for printing or writing on objects of plastics material, particularly rubber or silicone.

4 Claims, No Drawings

INK FOR INK JET PRINTING AND METHOD OF USING THE INK

BACKGROUND OF THE INVENTION

1. Field of the Invention

The present invention relates to an ink on the basis of solvents for ink jet printing systems, particularly continuous jet systems. The invention also relates to a method of using the ink for printing on rubber or silicone.

2. Description of the Related Art

Inks used in ink jet printing technology for printing on various rubber materials are known in principle. Such inks are essentially composed of solvents, coloring agents and binding agents. Pigments as well as dyes are used as coloring agents.

A disadvantage of such inks is their insufficient abrasion resistance and insufficient bonding to various types of plastics materials, especially on various types of rubber and silicone.

For evaluating the adherence, frequently the so called adhesive film test is used. When this test is performed, a film is placed on an area imprinted with ink, the film is pressed on and then pulled off again. In this test, a measure of the adherence of the ink on the substrate is the quantity of the ink residues which adhere to the adhesive film and which have been separated from the printed area when the film was pulled off.

It has also been found to be disadvantageous that markings printed on such plastics materials, especially rubber and silicone, can easily be rubbed off with the fingers or wear off quickly during daily use, and the imprints, which sometimes contain important information, become illegible or unattractive.

For example, EP 0 730 014 A1 discloses an ink jet ink for printing on non-porous surfaces, such as glass, metal or plastic containers, wherein the imprints are supposed to have a high rub resistance to alcohol. These inks have the disadvantage that their adherence to rubber and silicone is insufficient. A large portion of the imprint is separated from the printed surface when the adhesive film test is performed.

U.S. Pat. No. 4,168,254 discloses an ink jet ink for printing on cables encased in polymer, wherein the ink contains a resin for fixing the coloring agent on a substrate. Such an ink has the disadvantage that the abrasion resistance is achieved only by heating to a high temperature. The supplied heat activates a chemical reaction which causes cross-linking of the binding agent.

SUMMARY OF THE INVENTION

Therefore, it is the primary object of the present invention to provide an ink on the basis of solvents for ink jet printing, particularly for continuous jet systems, which does not have the disadvantages described above and which has a good adherence to almost all plastics materials and other smooth components and surfaces.

An ink for ink jet printing systems, particularly continuous jet systems, is primarily composed of coloring agents, organic solvents, conductivity mediators and at least one binding agent.

DESCRIPTION OF THE PREFERRED EMBODIMENTS

In accordance with the present invention, the ink contains a special mixture of at least two different binding agents.

The first binding agent is a bonding agent or also called primer, which preferably is a chemically modified polypropylene, a chemically modified low-chlorine polypropylene and/or low-chlorine polypropylene.

The first binder may also be a chemically modified polyethylene.

These binders have especially also in combination with the other components a very high affinity to rubber and silicone.

The second binding agent is preferably selected from acrylic polymers on the basis of iso-butyl methacrylate, methyl methacrylate and/or ethylacrylate. These binding agents serve primarily for fixing the coloring agent contained in the ink on the printed substrate, and for adjusting the viscosity to ensure that the ink operates without problems in the printing device. An optimum viscosity for continuous jet printing is in the range of 1–10 mPas.

In the following, the present invention will be described in detail in connection with several ink examples.

EXAMPLE 1

(Basic Example)

| | |
|---|---|
| 50 to 85% by weight | solvent, |
| 0.5 to 18% by weight | first binding agent as bonding agent, |
| 0.1 to 15% by weight | second binding agent as fixing agent, |
| 2 to 15% by weight | coloring agent, |
| 0.2 to 1.5% by weight | conductivity mediator, |
| 0 to 5% by weight | additional additives |

EXAMPLE 2

(White Ink)

| | |
|---|---|
| 71.5% by weight | ketone as solvent, |
| 6% by weight | bonding agent (first binding agent), |
| 11% by weight | acrylate resin (second binding agent), |
| 11% by weight | $TiO_2$ as coloring agent, |
| 0.5% by weight | conductivity mediator |

EXAMPLE 3

(Black Ink)

| | |
|---|---|
| 79.2% by weight | ketone as solvent, |
| 4% by weight | bonding agent (first binding agent), |
| 10% by weight | acrylate resin (second binding agent), |
| 6% by weight | solvent black 29 as coloring agent, |
| 0.8% by weight | conductivity mediator |

EXAMPLE 4

(Violet Ink)

| | |
|---|---|
| 79.2% by weight | ketone as solvent, |
| 4% by weight | bonding agent (first binding agent), |
| 10% by weight | acrylate resin (second binding agent), |
| 6% by weight | acid violet 66 as coloring agent, |
| 0.8% by weight | conductivity mediator |

Each of the inks of examples 1–4 contains as an organic solvent a ketone, such as acetone and/or ethyl methyl ketone, to which may be added cyclohexanone, ethylacetate, isopropanol and/or aromatic agents.

The solvents used should not dissolve the plastics materials which are to be imprinted.

The coloring agents used may be pigments, such as titanium oxide or dyes, such as solvent black 29, a chromium complex, solvent black 28, or acid violet 66, an azochromium complex.

However, in addition to the coloring agents already mentioned above, other compatible dyes or color pigments may be used.

It is irrelevant in this connection whether the dyes are present in the dry or liquid state. Also, the pigments which are used may be present in the pure state or in so called pigment preparations.

The conductivity mediators contained in the ink may be potassium thiocyanate, lithium nitrate and/or sodium perchlorate.

Such an ink is especially suitable for use for printing or writing on objects of plastics materials, particularly rubber or silicone substances.

The invention is not limited by the embodiments described above which are presented as examples only but can be modified in various ways within the scope of protection defined by the appended patent claims.

We claim:

1. An ink for ink jet printing systems, the ink comprising coloring agents, organic solvents, conductivity mediators, and first and second binding agents which differ from each other, wherein the first binding agent is a bonding agent and the second binding agent is a fixing agent and means for adjusting the viscosity, the first binding agent being a chemically modified polyethylene and/or selected from the group consisting of a chemically modified polypropylene, a chemically modified low-chlorine polypropylene and a low-chlorine polypropylene.

2. The ink according to claim 1, wherein the second binding agent is an acrylic polymer on the basis of iso-butyl methacrylate, methyl methacrylate and/or ethyl acrylate.

3. The ink according to claim 1, wherein the ink comprises 50 to 85% by weight solvent, 0.5 to 18% by weight first binding agent as bonding agent, 0.1 to 15% by weight second binding agent, 2 to 15% by weight coloring agent, 0.2 to 1.5% by weight conductivity mediator, and 0 to 5% by weight other additives.

4. A method of using an ink for ink jet printing systems, the method comprising printing or writing an ink composed of coloring agents, organic solvents, conductivity mediators, a first binding agent as bonding agent, and a second binding agent as a fixing agent and means for adjusting the viscosity, on objects of plastics material, particularly rubber or silicone substances, the first binding agent being a chemically modified polyethylene and/or selected from the group consisting of a chemically modified polypropylene, a chemically modified low-chlorine polypropylene and a low-chlorine polypropylene.

* * * * *